United States Patent

Schmidt et al.

[11] Patent Number: 5,841,214
[45] Date of Patent: *Nov. 24, 1998

[54] IDENTIFICATION MARK OPERATING WITH ACOUSTIC SURFACE WAVES

[75] Inventors: Frank Schmidt; Valentin Mágori, both of München; Leonhard Reindl, Stephanskirchen; Thomas Ostertag, Ulm, all of Germany

[73] Assignee: Siemens Aktiengesellschaft, Munich, Germany

[*] Notice: This patent issued on a continued prosecution application filed under 37 CFR 1.53(d), and is subject to the twenty year patent term provisions of 35 U.S.C. 154(a)(2).

[21] Appl. No.: 701,492

[22] Filed: Aug. 22, 1996

Related U.S. Application Data

[63] Continuation of PCT/DE95/00180 Feb. 14, 1995.

[30] Foreign Application Priority Data

Feb. 22, 1994 [DE] Germany .............................. 4405647.8

[51] Int. Cl.$^6$ ........................................................ G01S 13/80
[52] U.S. Cl. ...................... 310/313 D; 342/51; 333/153; 333/154
[58] Field of Search .................................. 73/570; 342/42, 342/44, 51; 340/572, 825.34, 825.72; 310/313 B, 313 D; 333/150, 153, 154

[56] References Cited

U.S. PATENT DOCUMENTS

| | | | |
|---|---|---|---|
| 3,931,597 | 1/1976 | Cho et al. | 333/154 |
| 4,096,477 | 6/1978 | Epstein et al. | 342/44 |
| 4,268,808 | 5/1981 | McIngailis | 333/195 |
| 4,336,514 | 6/1982 | Paige | 333/195 |
| 4,604,623 | 8/1986 | Skeie | 342/51 |
| 4,625,207 | 11/1986 | Skeie | 342/51 |
| 4,625,208 | 11/1986 | Skeie et al. | 342/51 |
| 4,737,790 | 4/1988 | Skeie et al. | 342/51 |
| 4,746,830 | 5/1988 | Holland | 310/313 O |
| 5,436,631 | 7/1995 | Magori et al. | 342/42 |
| 5,469,170 | 11/1995 | Mariani | 342/51 |

FOREIGN PATENT DOCUMENTS

| | | |
|---|---|---|
| 31 02 334 | 5/1986 | Germany . |
| 42 13 117 | 10/1993 | Germany . |
| 93/13495 | 7/1993 | WIPO . |

OTHER PUBLICATIONS

Publication entitled: "Siemens Zeitschrift Spezial FuE" [Siemens Journal of Research and Development Special Issue], spring 1993, pp. 26–30.

*Primary Examiner*—Hezron E. Williams
*Assistant Examiner*—Rose M. Miller
*Attorney, Agent, or Firm*—Herbert L. Lerner; Laurence A. Greenberg

[57] ABSTRACT

An identification mark operating with acoustical surface waves includes at least one reflector having higher reflectivity than a reflectivity of other reflectors.

3 Claims, 1 Drawing Sheet

IDENTIFICATION MARK OPERATING WITH ACOUSTIC SURFACE WAVES

CROSS-REFERENCE TO RELATED APPLICATION

This application is a Continuation of International Application Serial No. PCT/DE95/00180, filed Feb. 14, 1995.

BACKGROUND OF THE INVENTION

FIELD OF THE INVENTION

The present invention relates to an identification mark or ID tag operating with or using acoustic surface waves for identification systems, in which an interrogation/evaluation unit interrogates identification marks with an interrogation signal which is transmitted without wires and evaluates an encoded response signal sent back from the marks, wherein the encoding of the response signal is produced by the number and position of ID tag reflectors.

The generic type of identification marks, which are referred to below as ID tags for short, are used in identification systems for non-contacting automatic identification of objects and are known, for example, from the publication entitled: "Siemens Zeitschrift Spezial FuE"["Siemens Journal of Research and Development Special Issue"], spring 1993. Such ID tags are components in which an electrical signal is converted through the use of a transducer into an acoustical surface wave which is reflected on a sequence of reflectors, with the reflected acoustical surface wave being converted into an electrical signal again by a transducer which may be identical to the transducer that converts the electrical input signal. A predetermined code, which represents the ID tag, is produced as a function of the configuration of the reflectors. The electrical signal which represents the code is sent back to a system which emits the interrogation signal, as a result of which the point at which the ID tag is disposed can be identified. Such identification systems can be used in a large number of applications.

The interrogation has to be carried out at high power amplitudes because of the high attenuation of ID tags and the fact that the sensitivity reduces with the fourth power of the distance between the ID tag and the interrogating system. It is often desirable first of all to identify only the presence of an ID tag, before interrogating its coding. If it does not contain any additional information about its presence then the interrogation must be carried out permanently, that is to say the interrogating system must continuously radiate radio-frequency electromagnetic waves. Although there is still no well-founded evidence that radio-frequency electromagnetic alternating fields can cause stresses, it is nevertheless certain that permanent operation of the interrogation system for the above-mentioned purpose is also unfavorable for system reasons in cases in which it is initially only intended to identify that ID tags are present.

SUMMARY OF THE INVENTION

It is accordingly an object of the invention to provide an identification mark or ID tag operating with acoustic surface waves, which overcomes the hereinafore-mentioned disadvantages of the heretofore-known devices of this general type in such a way that permanent operation of an interrogating system can be avoided in cases in which it is initially intended only to detect the presence of ID tags.

With the foregoing and other objects in view there is provided, in accordance with the invention, in an identification system having an identification mark or ID tag operating with acoustic surface waves, and an interrogation/evaluation unit interrogating the identification mark with a wirelessly transmitted interrogation signal and evaluating an encoded response signal sent back from the identification mark, the identification mark, comprising ID tag reflectors having a reflectivity and having a number and position defining an encoding of the response signal; and at least one further reflector having greater reflectivity than the reflectivity of the reflectors defining the encoding.

In accordance with another feature of the invention, there is provided an interdigital converter, the reflectors being disposed in a sequence, and the reflector having high reflectivity being the last reflector in the sequence as seen from the interdigital converter.

In accordance with a concomitant feature of the invention, the reflector having high reflectivity is a dispersive reflector, and the reflectors defining the code are reflectors reflecting in a linear phase.

Other features which are considered as characteristic for the invention are set forth in the appended claims.

Although the invention is illustrated and described herein as embodied in an identification mark operating with acoustic surface waves, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
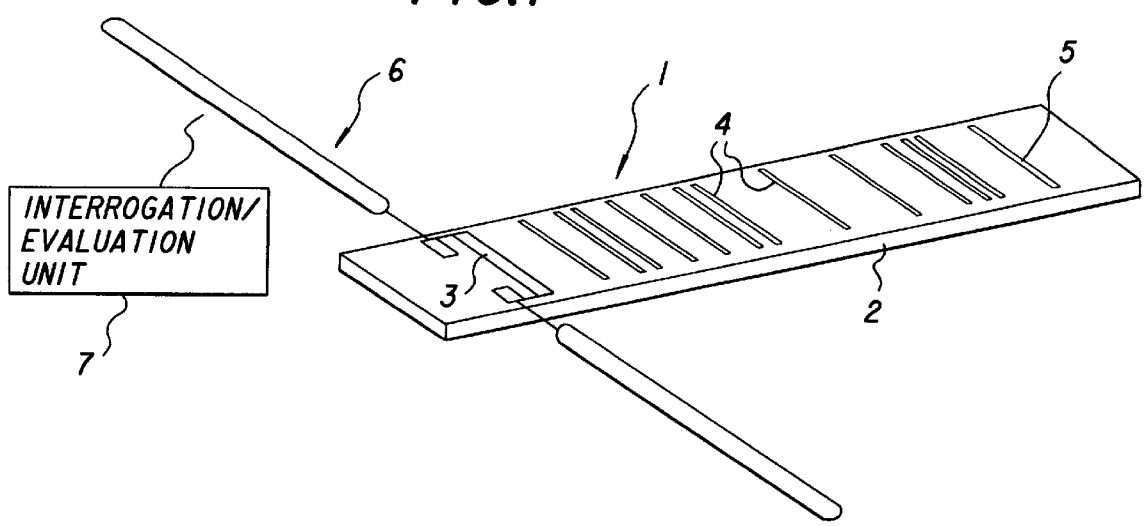
FIG. 1 is a diagrammatic, partially perspective view of a general layout of an identification mark having a reflector constructed according to the invention.

Referring now to the figures of the drawings in detail and first, particularly, to FIG. 1 thereof, there is seen an ID tag 1 which is formed in general by a piezoelectric substrate 2 on which an input/output interdigital converter 3 is disposed that converts an electrical signal, which is fed into it, into an acoustical surface wave that propagates on the surface of the substrate 2, and which converts an acoustical surface wave entering it back into an electrical signal. An electrical signal is fed into this input/output interdigital converter 3 and is transmitted from it, through an antenna 6. This antenna 6 receives an interrogation signal, which is transmitted without wires from an interrogation/evaluation unit 7, and emits an electrical signal from the input/output interdigital converter 3, in the form of an echo signal.

Furthermore, a plurality of reflectors 4 are provided on the piezoelectric substrate 2, which reflect the acoustical surface waves emitted by the input/output interdigital converter 3 back onto it, as a result of which a code is produced which is characteristic of the ID tag 1. This code is defined by the number and geometric configuration of the reflectors 4 on the substrate 2. It is emitted through the antenna 6 and is sent back to the interrogation/evaluation unit 7.

Figure 2:
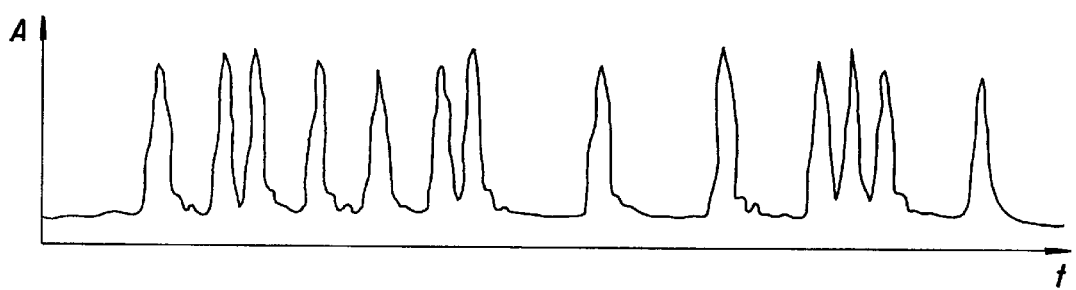
FIG. 2 is a diagram of an echo signal of an ID tag when interrogated with a short pulse, in the form of a time/amplitude function for a known ID tag.

An interrogation/evaluation unit 7 thus emits an electrical signal in the form of periodic, frequency-modulated or amplitude-modulated RF pulses. The RF power passes through the antenna 6 to the interdigital converter 3, which excites an acoustical surface wave on the crystal 2, with a small part of the excitation wave being reflected on the respective reflectors. This component has a power of less than 1% of the excitation wave power per reflector in order to keep low the effects of disturbing multiple echoes which can occur between the individual reflectors. The echo signal of the ID tag in the ideal case includes RF pulses of equal magnitude, which can be received and evaluated by the interrogation/evaluation unit 7. This situation is illustrated in the diagram of FIG. 2, in which an amplitude A of a pulsed echo signal of an ID tag 1, which is known per se, when interrogated with a short pulse, is illustrated as a function of time t.

At least one further reflector 5 is provided according to the invention on the ID tag 1 according to FIG. 1. The reflectivity of the further reflector 5 is high in comparison with the reflectivity of the other reflectors 4 in the reflector chain. This reflector 5 is preferably the last, seen from the interdigital converter 3, in the reflector chain. It is thus located behind the sequence of reflectors 4 which define the code of the ID tag 1. The reflectivity of this highly reflective reflector 5 may be defined, for example, by appropriate selection of a number of electrode fingers in the reflector, which are not illustrated specifically.

Figure 3:
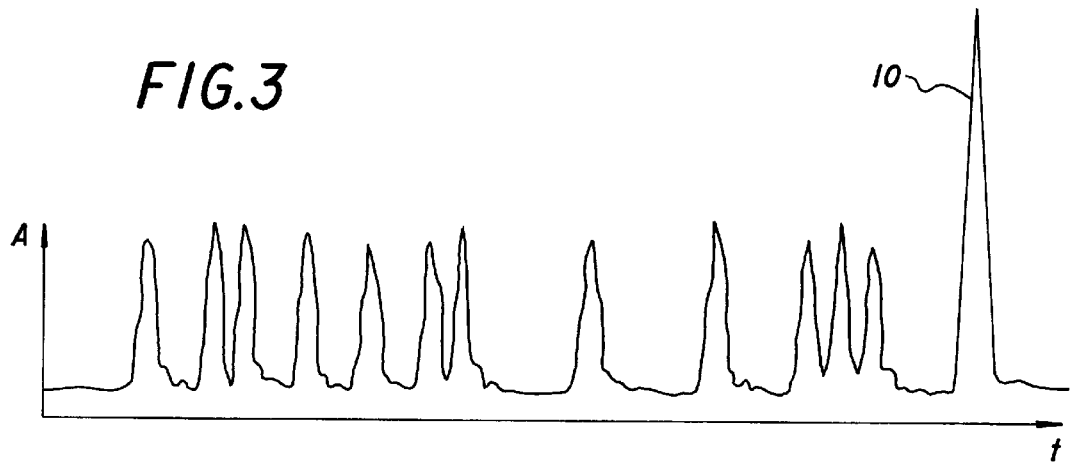
FIG. 3 is a diagram which corresponds to the diagram of FIG. 2, for an ID tag constructed according to the invention.

An interrogation at a relatively low power can thus be carried out in order to identify only the presence of the ID tag, so that the echo signal arriving at the interrogation/ evaluation unit 7 still has an amplitude which is sufficient for the evaluation, as a result of the greater reflectivity of the reflector 5. In other words, the amplitude of the pulse coming from the reflector 5 having greater reflectivity is a multiple of the amplitude of the encoding and data pulses. This situation is illustrated in the diagram of FIG. 3, in which the pulse produced by the reflector 5 having greater reflectivity is designated by reference numeral 10. In other respects, this diagram corresponds to the diagram according to FIG. 2, which has already been explained.

Particularly advantageous forms of signal evaluation are possible through the use of an ID tag constructed according to the invention. In general, upon first interrogation for identification of an ID tag, the time before the next interrogation can be selected to be great enough that disturbances caused by the reflector 5 having high reflectivity have decayed.

If the ID tag is located on a moving object, then an interrogation at a relatively low power can be carried out first of all in the region of an interrogation/evaluation unit, although this power is still sufficient to identify the ID tag as being present in the interrogation region of the interrogation/ evaluation unit, through the echo pulse which is produced by the reflector having high reflectivity. This transmitted power does not need to be sufficient at this stage for interrogation of the reflectors which define the code of the ID tag. Thus, for an ID tag which appears in the interrogation region, the pulse from the reflector having high reflectivity appears in an associated time window of the interrogation/evaluation unit. Furthermore, a longer interrogation pulse, having a resolution which is poorer, can be used for interrogation of the reflector having high reflectivity. That longer interrogation pulse has a narrower bandwidth and thus allows the receiver bandwidth to be reduced. This results in a lower noise level, which makes it possible to further reduce the transmitted power or to increase the range for a constant transmitted power. In order to read the code, the transmitted power can be increased until the ID tag leaves the interrogation region. This therefore results in an advantageous considerable reduction in the transmitted power which must be used in permanent operation in order to identify an ID tag which is possibly entering the interrogation region, as early as possible.

Furthermore, the reflector having high reflectivity represents a fixed time mark with respect to the echo signal which defines the code. The sequence of interrogation pulses can be averaged statistically with respect to time with the aid of this time mark, in order to obtain a greater signal to noise ratio with respect to system-synchronous disturbances.

Additionally, the above-mentioned time mark can also be used in particular in the case of the identification of moving objects, such as moving vehicles for example, to carry out Doppler compensation for coherent phase integration of the received code pulses, in that those pulses are related, in terms of their phase, to the pulse from the reflector having high reflectivity, or to another powerful pulse. For example, the code pulses can be buffer stored with the respectively associated pulse from the reflector having high reflectivity, as a phase reference, and they can subsequently be superimposed in the correct phase. This is necessary when a relative movement takes place between the ID tag and the reading unit during the reading process. Such an integration effectively improves the signal to noise ratio of the received signals, with it being possible to convert the gain achieved into a further reduction in the transmitted power or an increase in the range for interrogation at the same transmitted power.

Signal evaluations of the type mentioned above are known per se from radar technology.

Thus, in principle, it is possible as a result of the greater range to achieve longer measurement paths as well as improved resolution and measurement accuracy with ID tags constructed according to the invention, for movement, position and speed measurements.

According to a development of the invention it is possible, with respect to their physical type, to select different reflectors for the reflector having high reflectivity and the reflectors which define a code. For example, the reflector having high reflectivity may be constructed dispersively as is described, for example, in German Published, Non-Prosecuted Patent Application DE 43 36 897 A1, while the reflectors which define the code may be elements which reflect in linear phase.

We claim:

1. In an identification system having an identification mark or ID tag operating with acoustic surface waves, and an interrogation/evaluation unit interrogating the identification mark with a wirelessly transmitted interrogation signal and evaluating an encoded response signal sent back from the identification mark, the identification mark, comprising:

ID tag reflectors having a reflectivity and having a number and position defining an encoding of the response signal; and at least one further reflector having greater reflectivity than the reflectivity of said reflectors defining the encoding, said at least one further reflector receiving an interrogation pulse and returning an echo pulse within an assigned time window for identifying a presence of the ID tag, said at least one further reflector responding to the interrogation pulse having an energy level below a threshold level of interrogation by said ID tag reflectors.

2. The identification mark according to claim 1, including an interdigital converter, said reflectors being disposed in a sequence, and said reflector having high reflectivity being the last reflector in said sequence as seen from said interdigital converter.

3. The identification mark according to claim 1, wherein said reflector having high reflectivity is a dispersive reflector, and said reflectors defining the code are reflectors reflecting in a linear phase.

* * * * *